No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 1.

Witnesses. Inventor:
Edmund S. G. Rees.
by Henry Connett
Attorney

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 2.

Witnesses:

Inventor
Edmund S. G. Rees
by Henry Connett
Attorney

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 3.

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 4.

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 5.

Witnesses. Inventor.
Edmund S. G. Rees
by Henry Connett
Attorney

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 6.

No. 723,024. PATENTED MAR. 17, 1903.
E. S. G. REES.
LOCOMOTIVE AND CAR FOR USE ON SINGLE RAIL ELEVATED RAILWAYS.
APPLICATION FILED DEC. 24, 1901.
NO MODEL. 7 SHEETS—SHEET 7.

Witnesses. Inventor.

UNITED STATES PATENT OFFICE.

EDMUND S. G. REES, OF WOLVERHAMPTON, ENGLAND.

LOCOMOTIVE AND CAR FOR USE ON SINGLE-RAIL ELEVATED RAILWAYS.

SPECIFICATION forming part of Letters Patent No. 723,024, dated March 17, 1903.

Application filed December 24, 1901. Serial No. 87,062. (No model.)

*To all whom it may concern:*

Be it known that I, EDMUND SCOTT GUSTAVE REES, a subject of the King of Great Britain, residing at Wolverhampton, in the county of Stafford, England, have invented certain new and useful Improvements in Motor and other Vehicles for Single-Rail Railways, of which the following is a specification.

This invention has for its main object improved means for checking the rocking of a locomotive or car used upon what is known as a "single-rail elevated railway," which comprise improved methods of transmitting the rocking force in a sidewise direction to a guide rail or rails situated on the same side of the track as that toward which the locomotive or car is at the time tilting, but at a lower level than the main rail, and has also the object in the case of electrically-propelled locomotives or cars used upon such a railway of carrying the field-magnets in an improved manner, and the object in cases in which two guide-rails are used at each side of the track and are fixed against A-standards or other standards formed with slanting sides which support the main rail or are otherwise fixed so that the lower rails on opposite sides of the track are further apart than the upper rails is to adopt a common axis for each pair of guide-wheels (of which one wheel of the pair runs along the upper guide-rail and the lower wheel of the pair runs along the lower guide-rail) and construct the wheels in such manner that any vertical movement thereof has no tendency to throw their axis outward, whereby any tendency is avoided which would otherwise be experienced with pairs of wheels each having a common axis of opening out the framing or parts by which their axes are carried under any downward movement of the wheels in relation to the track, owing to the axes of the wheels on opposite sides of the track being inclined in relation to one another to suit the relative positions of the guide-rails.

The means according to this invention for transmitting the rocking force of a locomotive or car to the guide rail or rails is capable of variation in detail, but preferably comprises as a main feature rockers pivoted near to the longitudinal center of the locomotive or car, but at opposite sides thereof, in a manner which allows them to turn in planes at right angles to the track, and each formed substantially as an L-lever, with one arm projecting outward in a substantially horizontal direction and the other projecting downward parallel, or approximately so, with the sides of the supporting-standards, which are on the same side of the center of the track. The downward arms each carry a guide wheel or wheels which runs or run along the guide rail or rails at the same side of the track. The rocking force is transmitted to the outer ends of the horizontal arms of the rockers through the medium of springs and thence through the rockers to the guide-wheels, and thus a very easy action results. It is preferred to form each rocker with a strut between the arms to strengthen them. According to a modification of this part of the invention the axle-box, which is at one end of an axle, is supported against tilting through the medium of a rocker from the guide rail or rails at the same side of the track, while the axle-boxes of such axle which are at the other side of the track are supported from the guide rail or rails at such other side of the track against tilting by frames which are fixed to such axle-boxes.

In the case of electrically-propelled cars an axle may be driven by means of chain or other gear or the armature may be built directly onto the axle, and the magnets may be carried between and by two axle-boxes on one side of the wheel, with springs between the magnets and a rocker to carry part of the weight of the magnets, or when two axle-boxes are supported by a frame fixed thereto the magnets of a motor of which the armature is carried by such axle may be fixed directly to such frame.

In the case in which two guide-rails are used at each side of the line of A-standards or other standards having inclined sides which support the main rail or are otherwise fixed to standards which support the main rail, so that the lower rails are further apart than the upper, each pair of guide-wheels has a common axis which is parallel with the inclined sides of the standards which are at the same side of the track or with lines which pass, respectively, across the faces of the pairs of guide-rails at opposite sides of the track, and the bearing-surfaces of the wheels are formed each as a truncated cone, as seen in side elevation, with the sides of the bearing-surfaces which are against the rails vertical, and thus a vertical movement of the wheels has no tendency to throw the common axis of a pair of guide-wheels outward from the center of the track.

In order that the invention may be clearly understood, I will now proceed to describe practical applications of the same, which are illustrated, by way of example, in the accompanying drawings, wherein—

Figs. 3 and 4 correspond, respectively, to Figs. 1 and 2, but illustrate a modification of the means for transmitting the rocking force to a side rail or rails. In these views no part of the car-body is shown. In Fig. 3, however, the rocker is shown at each side of the track, and in Fig. 4 the outer plate of the bogie-frame is supposed to be cut away from the left-hand side of the figure and not from the right-hand side. Figs. 5 and 6 correspond, respectively, to Figs. 3 and 4, but show a further modification of the means for transmitting the rocking force to a guide rail or rails and means according to this invention of supporting the weight or a portion of the weight of the field-magnets. Fig. 6, however, is an outside view of the bogie, no part of the outer plate being cut away.

Figure 1:
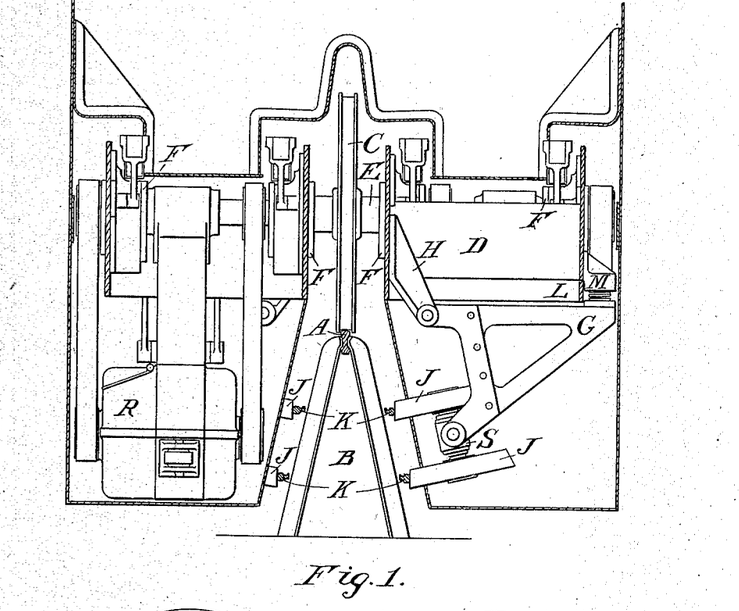
Figure 1 shows means according to this invention of transmitting the rocking force of a locomotive or car to a side rail or rails and the means according to this invention of preventing the axes of pairs of guide-wheels on opposite sides of the track from opening out as they move downward. This figure is a transverse section through the lower portion of an electrically-propelled car-body, showing also in section, taken in two different planes, a bogie at one end of the car. A rocker and guide-wheels at one end of the bogie are shown at the right-hand side of the figure; but the corresponding rocker is omitted at the left-hand side.
Figure 2:
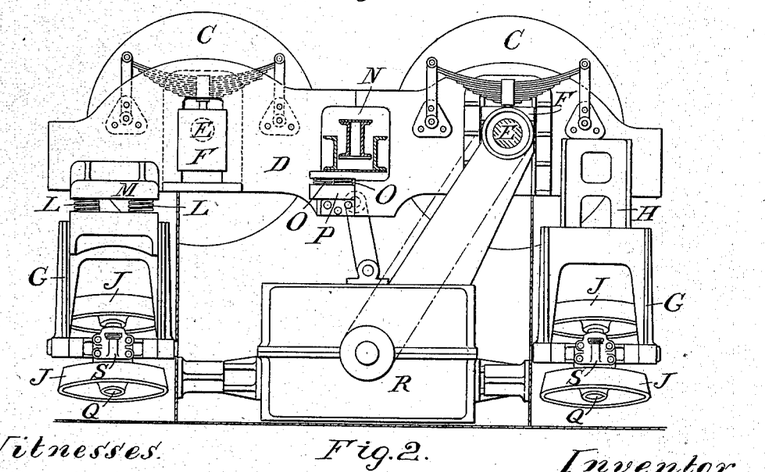
Fig. 2 is a side elevation of the bogie shown by Fig. 1 and the parts which it carries, except that the car-body is omitted. The outer plate of the bogie-frame is supposed to be cut away from the right-hand side of the figure.

Referring first to Figs. 1 and 2, A, Fig. 1, is the single rail which forms the track and is carried upon A-standards B. Each main wheel C, by which the bogie D is supported upon the rail A, is fixed in the center of its axle E, and each axle carries four axle-boxes F, one on each side of the wheel near thereto and one near to each end of the axle. Near each end of the bogie D and at each side thereof a rocker G is pivoted to a bracket H, which is fixed to the bogie near to the longitudinal center thereof. A downward portion of the rocker carries the guide-wheels J, which bear against the guide-rails K, which are fixed at the same side of the A-standards B, and the outer end of the rocker carries springs L, which support the outer side of the bogie through the medium of a bracket H, which is fixed thereto. Any sidewise movement of the bogie is thus transmitted to the rails K through the medium of the springs L and rockers G. The bolster H, to which the car-body is pivoted in the usual manner, is carried upon the bogie by means of springs O, interposed between its ends and brackets P, which are fixed to the bogie. Each rocker G is formed doubled-sided when it is intended to carry two guide-wheels, as shown, to admit the outer side of the upper wheel between the two sides of the rocker, and the guide-wheels J are fixed upon the ends of a spindle Q, which turns within a bearing S, which is pivoted transversely of its own axis between the lower ends of the two sides of the rocker. The axis of each pair of guide-wheels J—that is to say, the axis of each spindle Q—is parallel with a line passing across the faces of the two guide-rails at the same side of the A-standards, and to obviate any liability of the axis opening out as the wheels give downward the surfaces of the wheels are turned somewhat taper, so that any portion thereof which is at the time against a guide-rail will be vertical. This formation of guide-wheel enables a pair of guide-wheels to be used with a common axis in conjunction with guide-rails which are carried by inclined sides of the supports for the main rail or are otherwise carried so that the two lower rails on opposite sides of the track are farther apart than the two upper rails, even in cases in which such axes at opposite sides of the track are rigid in relation to one another. In Figs. 1 and 2 the motors R are shown to be arranged in position below the bogie-frame and drive the axles of the wheels C respectively through the medium of chain-gear.

Figure 3:
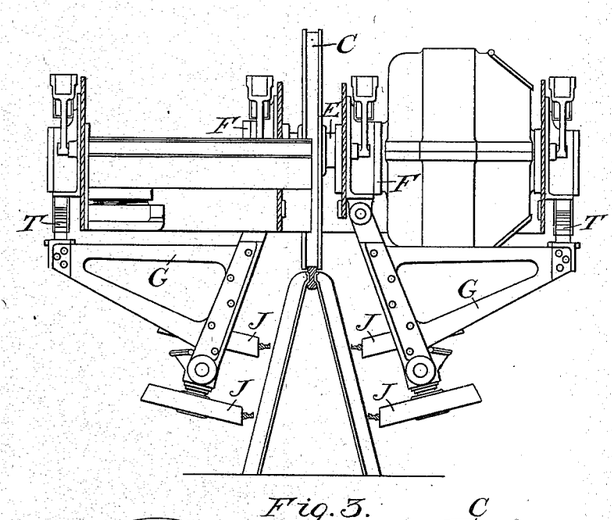
Figure 4:
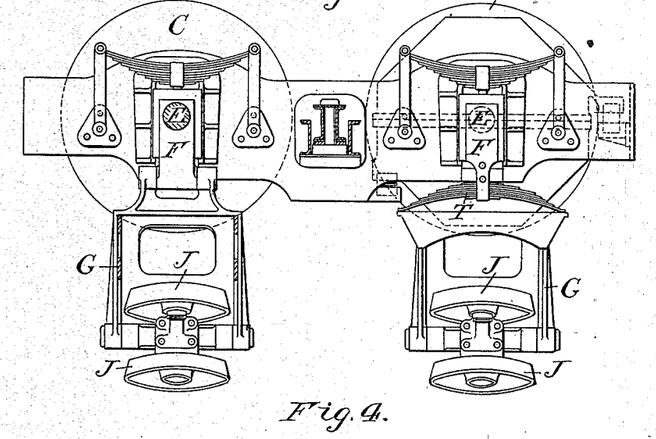

Referring now to Figs. 3 and 4, rockers G, which correspond to the rockers shown in the previously-described Figs. 1 and 2, are pivoted to the middle axle-boxes F of the axles E—that is to say, the rockers at one side of the bogie are pivoted, respectively, to the middle axle-boxes F which are at the same side of the wheels C, and the rockers at the other side of the bogie are pivoted, respectively, to the middle axle-boxes F which are at such side of the wheels C. The lower ends of the rockers carry the guide-wheels J similarly as such wheels are described as carried with reference to Figs. 1 and 2. The outer axle-boxes are supported from the outer ends of the rockers G through the medium of springs T. In these views the axles E are shown to be driven by motors, of which the armatures are respectively fixed upon the axles.

Figure 5:
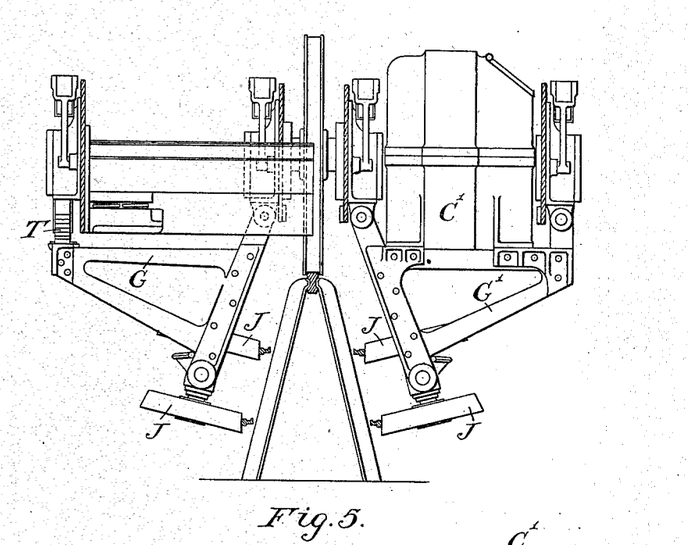
Figure 6:
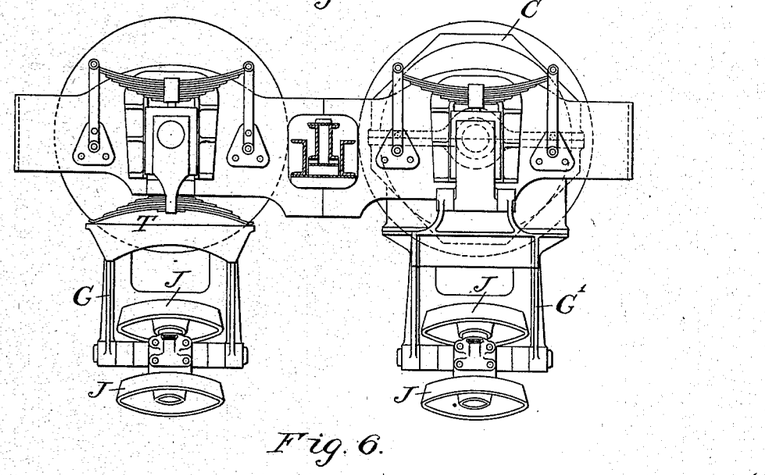

Referring now to Figs. 5 and 6, each axle of the bogie is supported against rocking by means of a rocker G, corresponding to the rockers G previously described, which is pivoted to the inner axle-box at the same side of the longitudinal axis of the bogie, or it may be to the bogie-frame, and supports the outer axle-box at the same side through the medium of a spring T and by a frame G', which carries guide-wheels J and is connected directly to both the inner and outer axle-boxes at the other side of such longitudinal axis. If in such case the axles are driven, as shown, by motors of which the armatures are built thereon, the field-magnets C' are supported, or partly so, upon the frames G', and as the motors of the respective axles are of course at opposite sides of the longitudinal axis of the bogie the frames for the respective axles are also at opposite sides of such longitudinal axis.

Figure 7:
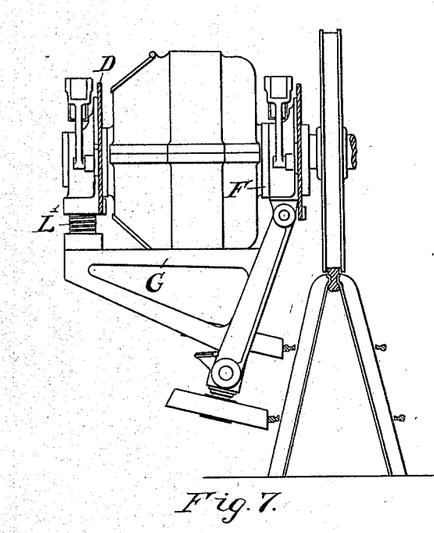
Fig. 7 is an end view of the left-hand side of a bogie, showing a further modification of the means of transmitting the rocking force to a guide rail or rails.
Figure 8:
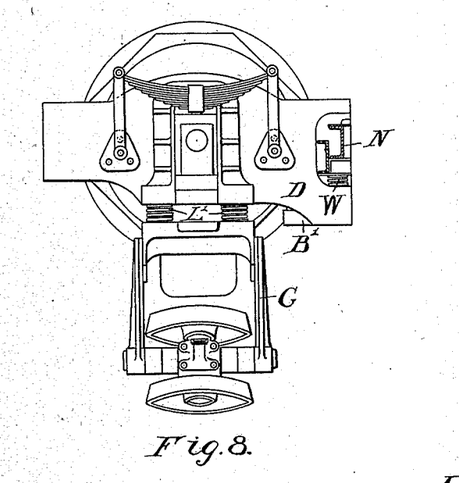
Fig. 8 is a side view of one end of the bogie shown by Fig. 7.

Referring now to Figs. 7 and 8, the rockers G, (of which one only is shown,) which correspond to the rockers G previously described, are pivoted at their inner ends to the inner axle-boxes F, and their outer ends support the bogie-frame D through the medium of springs L'. In these figures springs W are shown as interposed between the ends of the bolster N and brackets B', fixed to the bogie-frame D.

Figure 9:
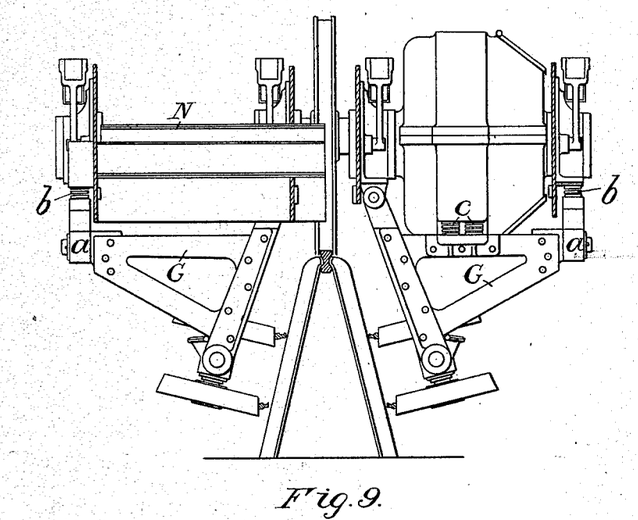
Figs. 9 and 10 correspond to Figs. 3 and 4 and illustrate a further modification of the means for transmitting the rocking force to a side rail or rails and of supporting a portion of the weight of the field-magnets.
Figure 10:
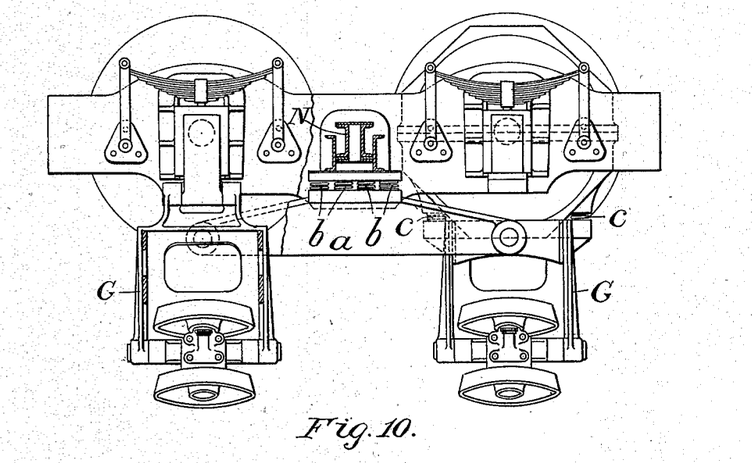

Referring now to Figs. 9 and 10, rockers G, corresponding to those before described, are pivoted at their inner ends, respectively, to the inner axle-boxes, or they may be pivoted to the bogie-frame. The rockers on the same side of the bogie are connected together by a longitudinal bar a, and between the middle of this bar and the corresponding end of the bolster N are interposed springs b, whereby any rocking movement of the locomotive or car-body is transmitted direct from the bolster to one of the bars a and thence to the rockers at the same side of the bogie instead of through the medium of the bogie-frame. The bar a is pivoted to the outer ends of the rockers with which it is connected to allow of the rockers adjusting themselves to distribute the pressure equally to their respective guide-wheels. According to a feature of the invention which is illustrated also by these views a portion of the weight of the field-magnets for each motor which are carried by one of the inner and one of the outer axle-boxes is supported by springs c from the rocker which is immediately below the motor.

Figure 11:
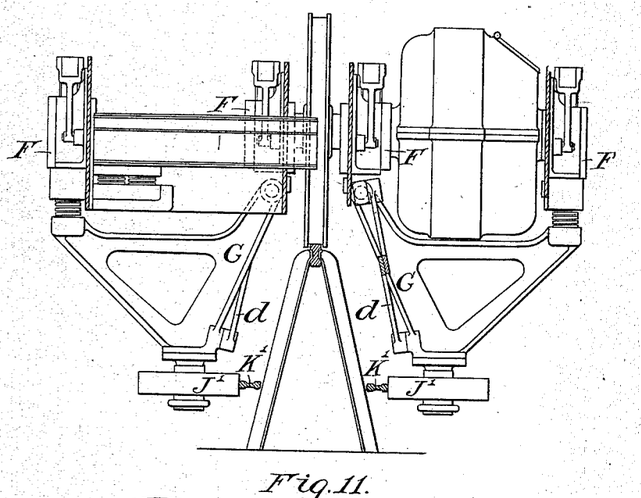
Figs. 11 and 12 correspond to Figs. 3 and 4 and illustrate a modification of the invention in which a single guide-wheel is carried by each rocker.
Figure 12:
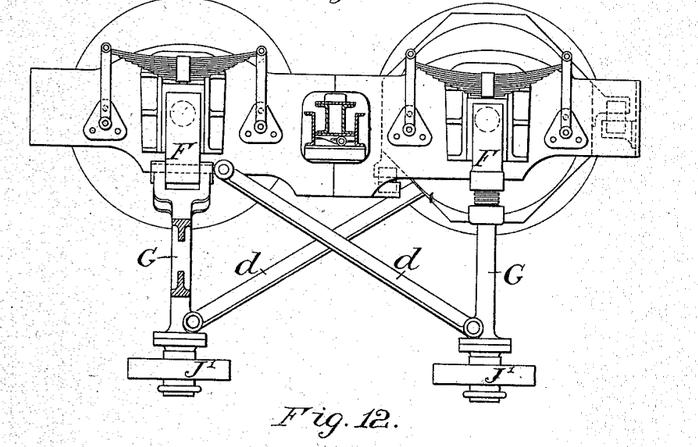

Referring now to Figs. 11 and 12, rockers G, which correspond to those previously described and which are shown as pivoted, respectively, to the inner axle-boxes F and as supporting the outer axle-boxes F from their outer ends through the medium of springs, similarly as in the modification shown by Figs. 3 and 4, but which may be pivoted direct to the bogie-frame and which may support the bogie-frame from their outer ends, if desired, have each a stud projecting downward from its lower end, upon which is mounted a single guide-wheel J' to run against a single guide-rail K' on the same side of the track. The two rockers on the same side of a bogie are braced together by diagonal bars d, the upper ends of which, as shown, are connected with the pivot-pins by which the inner ends of the rockers are pivoted to the inner axle-boxes. Either pin may turn to allow of one rocker rocking slightly in excess of the other at any given moment. In cases in which according to this invention each outer axle-box is supported against rocking from the end of a rocker, such as a rocker G, or one outer axle-box of each axle is so supported, and the other outer axle-box is supported against rocking by a frame, such as a frame G', each main axle is kept in an approximately horizontal position, and axles thus steadied can be used to carry any ordinary description of locomotive or car frame, rendering it unnecessary to carry the sides of such frame down on etiher side of the supporting-frames of the main rail, and in all cases in which a rocking movement of the locomotive or car body is transmitted to the guide-rails in any manner, such as above described, it is unnecessary to carry the sides of the car-frame down on either side of the supporting-frames of the main rail, and therefore any ordinary description of locomotive or car body may be used.

According to each modification above described of the means for transmitting the rocking force to a side rail or rails the axles E of an electrically-propelled car may be driven by means of chain or other gear or by means of a motor of which the armature is built directly onto the axle.

Figure 13:
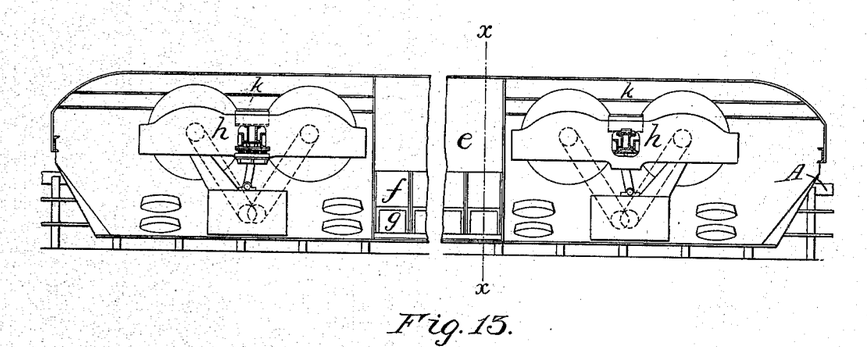
Fig. 13 is a side elevation, with the outer side removed, of a locomotive or car having the bogies arranged beyond the ends of the body, whereby my improved means of transmitting the rocking force to a guide rail or rails may be adopted in combination with a body which is carried down on both sides of the supporting-standards.
Figure 14:
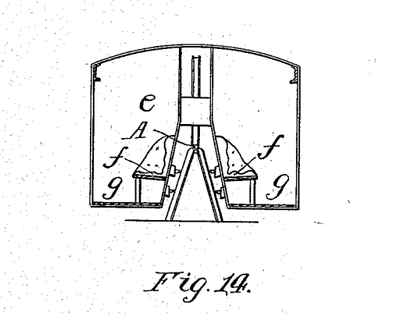
Fig. 14 is a transverse section taken on line $x$ $x$ of Fig. 13.

Referring now to Figs. 13 and 14, the bogies h are arranged, respectively, beyond the ends of the car-body e, and portions k of the framing of the car-body are extended beyond the ends of the body for connection with the bogies. This arrangement admits of the rocking force being transmitted to the guide rail or rails in any manner above described and at the same time allows portions g of the body to be carried down at opposite sides of the track below the level of the main rail A and the seats f to be arranged within such portions of the body.

Having fully described my invention, what I claim, and desire to secure by Letters Patent, is—

1. A vehicle for the purpose specified, having main supporting-wheels to run on the single rail of the track, side rockers which extend out laterally and depend below the rail of the track, and which are hinged at their inner, upper parts to some part of the vehicle, cushion-springs between the outer portions of the respective rockers and some part of the vehicle, and guide-wheels carried by the respective rockers and adapted to bear on a guard rail or rails on the track.

2. A vehicle for the purpose specified, having main supporting-wheels to run on the single rail of the track, the axle and axle-boxes of said wheels, dependent side rockers hinged to the respective inner axle-boxes of said supporting-wheels, cushion-springs between the outer arms or parts of said rockers and the respective outer axle-boxes of said wheels, and guide-wheels carried by the respective rockers and adapted to bear on a guide rail or rails on the track.

3. A vehicle for the purpose specified, having a main supporting-wheel to run on the single rail of the track, the axle and axle-boxes of said wheel, two dependent side rockers hinged at their inner upper parts to some part of the vehicle, a longitudinal bar pivotally connected at its ends with the outer ends of the respective rockers, a spring between the middle of such bar and some part of the vehicle, and guide-wheels carried by the respective rockers and adapted to bear on a guide rail or rails of the track.

4. A vehicle for the purpose specified, having main supporting-wheels to run on the single rail of the track, a dependent side rocker hinged at its inner, upper part to some part of the vehicle, a cushion-spring between its outer, upper part and some part of the vehicle, and guide-wheels mounted rotatively on a common axle pivotally mounted on the rocker, the pivotal axis of said common axle being transversely of its longitudinal axis.

5. A vehicle for the purpose specified, having a main supporting-wheel to run on the single rail of the track, the axle and axle-boxes of said wheel, a dependent side rocker hinged at its upper part to some part of the vehicle, a spring between the outer end of said rocker and some part of the vehicle, and two coned guide-wheels rotative on a common axle pivotally mounted on the said rocker, the pivotal axis of said common axle being transversely of its longitudinal axis.

6. A vehicle for the purpose specified, having a bogie-frame, two supporting-wheels mounted therein to run on the single rail of the track, lateral rockers dependent from said frame at one side of the track, said rockers being hinged at their inner upper ends to some part of the vehicle, cushion-springs between the outer portions of said rockers and some part of the vehicle, and connecting-braces between said rockers.

7. A vehicle for the purpose specified, having a supporting-wheel to run on the single rail of the track, the axle and axle-boxes of said wheel, an electric motor for driving said shaft directly, said motor being situated at one side of the supporting-wheel, a pendent frame carrying the field-magnet of the motor, a guard wheel or wheels carried by said frame and adapted for bearing on a guard rail or rails on the track, a pendent rocker at the other side of the supporting-wheel, said rocker being hinged at its inner upper end to some part of the vehicle, a cushion-spring between the rocker and the outer axle-box at that side, and a guard wheel or wheels carried by said rocker and adapted for bearing laterally on a guard rail or rails on the track.

8. The combination with a track having a single track-rail to support the vehicle and two guard-rails at its side, said guard-rails being below the track-rail, at different levels and at different distances from the axis of the track, of a vehicle to run on said track, said vehicle having guard-wheels of truncated or bevel form, of which each pair of wheels have a common axis passing through their centers.

9. A vehicle for the purpose specified, having main supporting-wheels to run on the single rail of a track, the axle and axle-boxes of said wheels, pendent side rockers having each a downwardly-extending and an outwardly-extending substantially horizontal arm hinged to a part of the vehicle, cushion-springs between the outer ends of the outwardly-extending arms of said rockers and outer axle-boxes of the supporting-wheels, and guide-wheels carried by the downwardly-extending arms of the respective rockers and adapted to bear on a guide rail or rails on the track.

In witness whereof I have hereunto signed my name, this 14th day of December, 1901, in the presence of two subscribing witnesses.

EDMUND S. G. REES.

Witnesses:
 STEPHEN WATKINS,
 ROBERT G. GROVES.